(12) United States Patent
Ota

(10) Patent No.: US 6,435,712 B1
(45) Date of Patent: Aug. 20, 2002

(54) RADIANT TYPE THERMOMETER

(75) Inventor: Hiroyuki Ota, Kyoto-fu (JP)

(73) Assignee: Omron Corporation, Kyoto (JP)

( * ) Notice: Subject to any disclaimer, the term of this patent is extended or adjusted under 35 U.S.C. 154(b) by 43 days.

(21) Appl. No.: 09/645,307

(22) Filed: Aug. 25, 2000

(30) Foreign Application Priority Data

Aug. 27, 1999 (JP) ............................................ 11-242259

(51) Int. Cl.$^7$ .............................. G01J 5/02; G01K 1/00
(52) U.S. Cl. ........................ 374/131; 374/121; 600/474; 600/549
(58) Field of Search ................................. 374/158, 208, 374/209, 131, 121; 600/549, 474

(56) References Cited

U.S. PATENT DOCUMENTS

| | | | |
|---|---|---|---|
| 5,012,813 A | 5/1991 | Pompei et al. ............... | 128/664 |
| 5,066,142 A | * 11/1991 | DeFrank et al. ............. | 374/131 |
| 6,195,581 B1 | * 2/2001 | Beerworth et al. .......... | 600/474 |
| 2001/0021218 A1 | * 9/2001 | Fukura et al. .............. | 374/208 |

FOREIGN PATENT DOCUMENTS

| | | |
|---|---|---|
| EP | 0 875 197 A1 | 11/1998 |
| WO | WO 97/01083 | 1/1997 |

\* cited by examiner

Primary Examiner—Diego Gutierrez
Assistant Examiner—Gail Verbitsky
(74) Attorney, Agent, or Firm—Morrison & Foerster, LLP

(57) ABSTRACT

A radiant type thermometer capable of improving the strength of a protecting member such as a protecting plate and a protecting film is provided. The radiant type thermometer comprises a main body (1), a tubular probe (2) fixed to said main body (1) with its end extruding from said main body (1) and its inside forming a path for infrared rays from the subject to the inside of said main body (1), a protecting member (11) for blocking an opening in the end side of said probe(2) and transmitting infrared rays and a supporting body (12) for supporting said protecting member (11) by touching said protecting member (11), disposed in parallel with the central axis (L1) of said probe (2) in the path inside said probe (2), with its end part disposed in the direction perpendicular to said central axis (L1) being fixed to the internal wall (2a) of said probe (2).

13 Claims, 5 Drawing Sheets

RADIANT TYPE THERMOMETER

BACKGROUND OF THE INVENTION

1. Field of the Invention

The present invention relates to a radiant type thermometer for measuring the temperature of a subject based on infrared rays irradiated from the subject.

2. Description of the Related Art

There have been conventionally proposed radiant type thermometers for measuring infrared rays irradiated from the eardrum with an infrared ray sensor in a non-contacting manner to find the temperature of the eardrum (see International Publication No. 97/01083, U.S. Pat. Nos. 5,653,238, 5,628,323, 5,445,158, 5,381,796, 5,199,436, 5,645,350, 5,368,038, 5,293,877 and 5,179,936).

A radiant type thermometer has a main body and a probe extending outward from the main body that is inserted in the ear hole (the external auditory meatus) when the temperature of the eardrum is measured. An infrared ray sensor for detecting infrared rays having entered inside the probe from the eardrum when the probe is inserted in the external auditory meatus and a microcomputer for calculating the temperature of the eardrum based on the detection results of the infrared ray sensor are mounted inside the main body. The temperature of the eardrum calculated by the microcomputer is displayed on a display device provided in the main body.

When a user measures the temperature of the eardrum, the user holds the main body and presses a measurement-starting switch after inserting the probe in the external auditory meatus of a subject. Then, the infrared ray sensor detects infrared rays from the eardrum and the microcomputer causes the display device to display the temperature of the eardrum based on the detected infrared rays. The user can recognize the body temperature of the subject by referring to the temperature of the eardrum displayed on the display device.

FIG. 9 illustrates an internal structure of the probe in a conventional radiant type thermometer. A probe 51 is formed in a tubular shape and its inside forms a path connecting its outside and the inside of a main body 55. A waveguide 54 for infrared rays is disposed coaxially with the probe 51 in the path and an infrared ray sensor 52 is disposed on the central axis of the probe 51 inside the main body 55.

In addition, a protecting plate 53*a* using silicon (Si) or Germanium (Ge) blocks an opening of the head of the probe 51 against infrared rays to prevent foreign material from entering inside the probe 51. Alternatively, as shown in FIG. 10, the end part of the probe 51 of the waveguide 54 is covered by a protecting film 53*b* using a transparent film made of polyethylene (PE) or polypropylene (PP) with respect to infrared rays to prevent foreign material from entering inside the waveguide 54.

Technologies described below are known as structures using similar protecting members.

For example, Japanese Patent Application Laid-open No. Hei 5-261070 discloses a structure for forming a window made of a glass-like material and the like that is transparent with respect to infrared rays as zinc selenide at the end in a probe side of a waveguide of a radiant type thermometer and preventing a pollutant from entering the waveguide by protecting its circumference with a tubular sleeve. In addition, Japanese Patent Application Laid-open No. Hei 8-189863 discloses a structure of a radiant type thermometer that has a plate-like portion covering the front face of a lens guiding infrared rays from a waveguide of a probe to an infrared ray sensor and a tubular attaching portion, and is detachably equipped with a lens cover made of polyethylene and the like, thereby does not require a probe cover. Moreover, Japanese Patent Application Laid-open No. Hei 8-313357 discloses a structure of a radiant type thermometer that adheres a substantially disc-shaped cover made of an infrared ray transmitting material such as silicon to the end of a probe to prevent foreign matter from entering inside the probe. Furthermore, Japanese Patent Application Laid-open No. Hei 10-118035 discloses a structure of a radiant type thermometer that equips the end of a probe of the thermometer with a shielding member made of an infrared ray transmitting material such as polyethylene and the like and makes the shielding member at the end part of the probe a shielding film having a plurality of small holes to protect the probe. Further, Japanese Patent Application Laid-open No. 11-32998 discloses a structure of a probe of a radiant type thermometer that is covered by a protection sheet made of an infrared ray transmitting resin material so as to cover an end opening of a waveguide to prevent foreign material and the like from entering inside the waveguide.

Foreign material and dusts stick to the above-mentioned protecting plate 53*a* and protecting film 53*b* or other protecting members through the use of a radiant type thermometer. Since these foreign material and dusts interrupt infrared rays that should reach the infrared ray sensor 52, these must be removed.

However, the protecting plate 53*a* and the protecting film 53*b* as well as other protecting members are only stretched or stuck on the end part of the probe 51 in the direction perpendicular to the central axis of the probe 51. For this reason, it is possible that the protecting plate 53*a* or the protecting film 53*b* and the like are damaged by force applied from outside against the protecting plate 53*a* or the protecting film 53*b* and the like when foreign material and the like are removed.

In addition, since the protecting plate 53*a* has higher strength than the protecting film 53*b*, it is considered that the possibility of damage is lower when the protecting plate 53*a* is used than when the protecting film 53*b* is used. However, since the protecting plate 53*a* is more expensive than the protecting film 53*b*, there is a problem that manufacturing costs of a radiant type thermometer are higher when the protective plate 53*a* is used.

An object of the present invention is to provide a radiant type thermometer capable of improving the strength of protecting members such as a protecting plate and a protecting film.

SUMMARY OF THE INVENTION

In order to solve the above-mentioned problems, the present invention adopts the following structure:

A first aspect of the present invention is a radiant type thermometer for measuring the temperature of a subject based on infrared rays emitted from the subject wherein the radiant type thermometer is provided with a main body, a tubular probe fixed to the main body with its end protruding from the main body and its inside forming a path of infrared rays from the subject to inside of the main body, a protecting member for blocking an opening in the end side of the probe and transmitting infrared rays and a supporting body disposed in parallel with the central axis of the probe in the path inside the probe with its end part disposed in the direction perpendicular to the central axis being fixed on the internal wall of the probe and supporting the protecting member by contacting the protecting member.

In accordance with the first aspect of the present invention, since the supporting body for supporting the protecting member is provided, the strength of the protecting member can be improved.

The supporting body is provided such that it does not completely block the path. The supporting body can be composed, for example, of a plate-like member. The supporting body can be also composed, for example, of a plurality of plate-like members disposed in parallel to each other. The supporting body can be also composed, for example, of two plate-like members perpendicular to each other. The supporting member can be also composed, for example, of a plurality of plate-like members crossing with each other.

In addition, the supporting body can be composed, for example, of a plurality of plate-like members disposed so that an end face in the direction of the central axis of the probe forms a polygon. If the supporting body is composed of a single or a plurality of plate-like members, the thickness of the plate-like members is preferably an integer times of the wavelength of infrared rays passing through the protecting member. Further, the plate-like member is formed, for example, of polyethylene or polypropylene. The thickness of the plate-like member can be composed of 0.01 mm to 0.5 mm, preferably 0.1 mm to 0.5 mm.

Moreover, the end face in the direction of the central axis of the probe of the supporting body can be composed in the lattice shape.

A second aspect of the present invention is a radiant type thermometer for measuring the temperature of a subject based on infrared rays emitted from the subject wherein the radiant type thermometer is provided with a main body, a tubular probe fixed to the main body with its end protruding from the main body and its inside forming a path of infrared rays from the subject to inside of the main body, a protecting member for blocking an end part of the probe and transmitting infrared rays, and a supporting body disposed coaxially with the central axis of the probe inside the probe with a plurality of through holes having axes parallel with the central axis of the probe and supporting the protecting member by contacting the protecting member.

If the probe and the supporting body are cut in the direction perpendicular to the central axis of the probe, the first and the second aspects of the present invention preferably have the occupancy of the area of the supporting body to the area of inside the probe in the cross section of more than 0% and 50% or less.

In addition, in the first and the second aspects of the present invention, the supporting body can take, for example, a structure in which it is integrally formed with the protecting member. Further, the supporting body can take, for example, a structure in which it is integrally formed with the probe. Alternatively, the supporting body can take, for example, a structure in which the protecting member and the probe are integrally formed.

BRIEF DESCRIPTION OF THE DRAWINGS

In the accompanying drawings.

DESCRIPTION OF THE PREFERRED EMBODIMENT

Embodiments of the present invention will now be described with reference to the drawings.

First Embodiment

Structure of a Radiant Type Thermometer

Figure 1A:
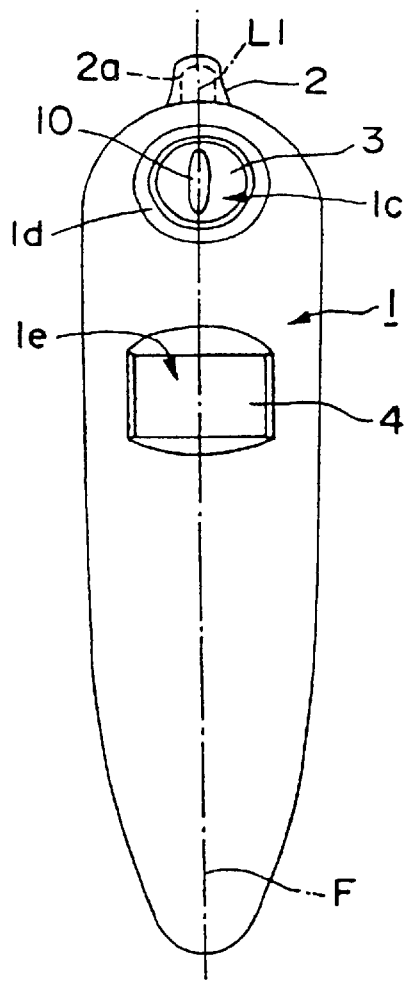
FIG. 1 illustrates a structure of a radiant type thermometer in accordance with the first aspect of the present invention.
Figure 1B:
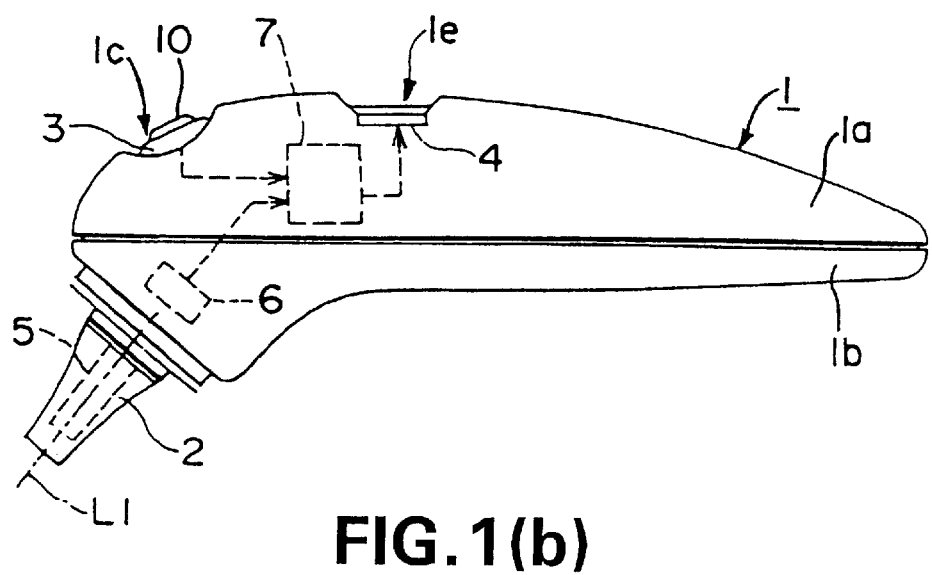

FIG. 1A is a front elevational view of a radiant type thermometer in accordance with the first embodiment of the present invention and FIG. 1B is a left side elevational view of a radiant type thermometer shown in FIG. 1A. As shown in FIG. 1A and FIG. 1B, a radiant type thermometer is for measuring the temperature of a subject by measuring the temperature of the eardrum of the subject and is equipped with a main body 1, a probe 2, a switch 3 for starting measurement as a measurement-starting switch and a display device 4.

The main body 1 has a longitudinal direction (basic plane F direction) and a latitudinal direction (direction perpendicular to the basic plane F), further has a front side and a rear side and is composed by joining a front side member 1a and a rear side member 1b. The main body 1 is substantially plane symmetry with respect to the basic plane F including a central axis L1 of the probe 2.

The front side member 1a is formed in a dome shape with a curvature larger in one end side in the longitudinal direction than in the other end side. The surface shape is composed of a curved face with an end face, when the front side member 1a is cut, being substantially an arc shape when it is cut in any part in the longitudinal direction if it is cut in the latitudinal direction.

A circular first opening 1c is provided in one end side of the front side member 1a. Around the first opening, a ring shaped periphery part 1d is formed inclining downwardly to the inside of the front side member 1a. In addition, a second opening 1e is provided in the middle part of the front side member 1a.

The probe 2 is formed in a truncated cone shape with the both ends opening and the base end part larger in diameter than the end part and protrudes inclining outwardly from one end side of the rear side member 1b of the main body 1 with the base end part fixed to the main body 1. With this structure, the end part of the probe 2 protrudes outwardly from one end in the longitudinal direction of the main body 1 when the radiant type thermometer is viewed from its front. Further, the probe 2 maybe formed integrally with the main body 1 or may be structured detachably.

A switch 3 has a circular plane shape and is exposed from a first opening 1c. An indicator 10 is formed in embossing on the surface of the switch 3. The indicator 10 is disposed on the base plane F so that a user can recognize the left side and the right side of the main body 1 by viewing or touching the indicator 10. That is to say, the indicator 10 is provided so that a user can recognize and execute a plurality of ways of holding the main body 1.

A display device 4 is embedded in the second opening 1e of the front side member 1a and its rectangular display face consisting of an LCD (liquid crystal display) is exposed.

A cylindrical shaped waveguide 5 is provided in the probe 2. In addition, a thermopile 6 including a infrared ray sensor and a temperature sensor (thermistor) for detecting infrared rays from the eardrum and a microcomputer 7 for calculating the temperature of the eardrum based on the infrared rays detected by the thermopile 6 are provided inside the main body 1.

Usage and operation of the radiant type thermometer shown in FIG. 1 are as follows: first, the probe 2 is inserted in the ear hole of a subject after the power of the radiant type thermometer (not shown)is turned on. Then, measurement processing of the temperature of the eardrum is started when the switch 3 is pressed.

With the probe 2 inserted in an ear hole, infrared rays emitted from the eardrum reach the thermopile 6 through the probe 2 and the waveguide 5. When the infrared rays from the eardrum reach the infrared ray sensor of the thermopile 6, the temperature of the infrared ray sensor rises.

When the measurement processing is started, the microcomputer 7 inputs a measurement-starting signal in the thermopile 6. When the measurement-starting signal is input in the thermopile 6, the infrared ray sensor inputs in the microcomputer 7 a signal proportional to an increased value of temperature corresponding to the volume of the infrared rays reached (irradiated on) itself during a predetermined measurement time. In addition, the temperature sensor of the thermopile 6 inputs a signal corresponding to the temperature of the infrared ray sensor itself in the microcomputer 7.

Then, the microcomputer 7 calculates the temperature of the eardrum of the subject based on the input signals from the infrared ray sensor and the temperature sensor, displays the calculated results on the display device 4 after sounding a measurement-finishing buzzer (not shown), and finishes the measurement processing. The user and the subject can thereafter recognize the temperature of the subject if they refer to the temperature of the eardrum (body temperature) displayed on the display device 4.

Internal Structure of the Probe

Figure 2A:
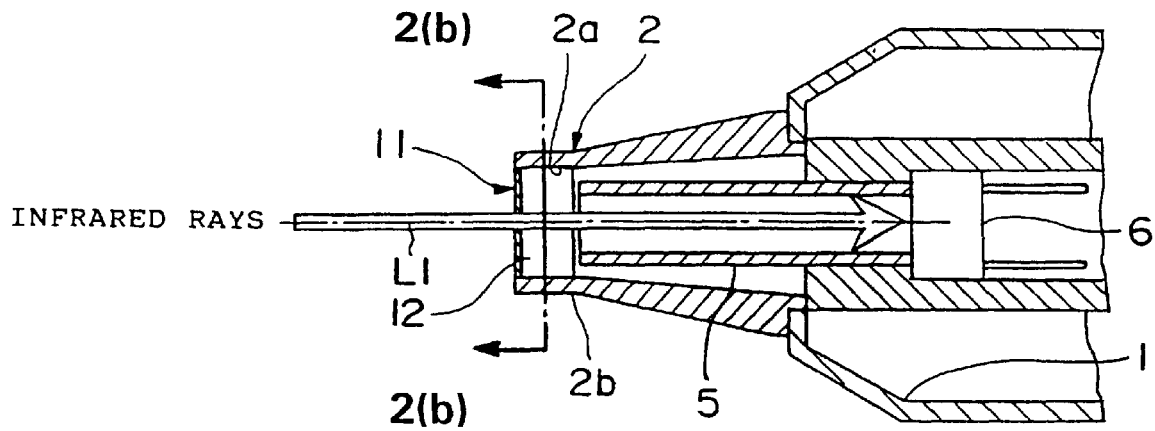
FIG. 2 illustrates an internal structure of a probe shown in FIG. 1.
Figure 2B:
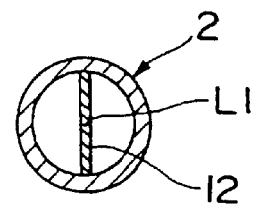

An internal structure of the probe 2 of the radiant type thermometer shown in FIG. 1 will now be described. FIG. 2 illustrates an internal structure of the probe 2 shown in FIG. 1. FIG. 2A is a cross sectional view of the radiant type thermometer shown in FIG. 1 when it is cut along an assumed plane that is parallel with the central axis L1 and perpendicular to the base plane F. FIG. 2B is a cross sectional view of the probe 2 shown in FIG. 2A when it is cut along the line X—X in the figure.

In FIG. 2A, the probe 2 is formed in a tubular shape and the inside of the probe 2 is an internal space continuously leading to the inside of the main body 1. An internal wall 2a of the probe 2 is formed of tubular face that is coaxial with the central axis L1 from its end part to a part recessed toward the side of the base end to some extent (hereinafter referred to as "a middle part 2b") and is formed of a circumferential surface of a truncated cone coaxial with the central axis L1 from the middle part 2b to the end part.

The waveguide 5 is coaxial with the central axis L1 and is disposed from the inside of the probe 2 to the inside of the main body 1. The infrared ray sensor of the thermopile 6 is disposed over an extended line of the central axis L1 of the probe 2.

As described above, the inside of the probe 2 forms a path for infrared rays from the eardrum to reach the infrared ray sensor of the thermopile 6. With such a structure, infrared rays incident into the probe 2 is directly irradiated on the infrared ray sensor through the waveguide 5 and the thermopile 6 can accurately detect infrared rays from the eardrum.

The end part of the probe 2 is blocked by a protecting member 11 and prevents foreign material, dusts and the like from entering inside the probe 2. The protecting member 11 is a flat plate-like member (protecting plate) with circular end face formed from silicon or germanium.

The protecting member 11 is disposed in the direction perpendicular to the central axis L1 and its side is fixed to the internal wall 2a of the probe 2. However, since the protecting member 11 is transparent with respect to infrared rays, infrared rays from the eardrum pass through the protective member 11 and reach the thermopile 6.

A supporting body 12 for supporting the protecting member 11 is provided in the internal space between the end part and the middle part 2b of the probe 2. The supporting body 12 is a flat plate-like member with a rectangular end face. The supporting body 12 is disposed on the central axis L1 and each end part (side) in the direction perpendicular to the central axis L1 is fixed to the internal wall 2a of the probe 2 (see FIG. 2B).

Substantially entire end part (side) of the supporting body 12 in the end side of the probe touches an end face of the protecting member 11 in the base end side of the probe 2. With this structure, the protecting member 11 is supported from the internal side of the probe 2. Further, both end faces of the supporting body 12 in the direction of the central axis L1 are parallel and perpendicular to the central axis L1.

In this embodiment, the internal diameter in the end side of the probe 2 is formed at 5.5 mm and the thickness of a plate-like member constituting the supporting body 12 is formed at 0.4 mm which is made an integer times of the wavelength of an infrared ray (5 $\mu$m to 12 $\mu$m) passing through by the protecting member 11. Due to this, the transmittance of infrared ray can be increased.

The cross section of the supporting body 12 in the direction perpendicular to the central axis L1 occupies 50% or less with respect to the cross section of the probe 2 in the direction perpendicular to the central axis L1 of the internal space from the end part to the middle part 2b. With this structure, infrared rays sufficient in volume for a proper measurement of the temperature of the eardrum reaches the thermopile 6 even if infrared rays passing through the protecting member 11 is interrupted by the supporting body 12 to some extent.

The shapes of both end faces of the supporting body 12 have the same shape of the cut face of the supporting body 12 as shown the drawing 2(b). The shape of the cut face does not change even if it is cut on any positions in the direction of the central axis L1. The same holds true for the supporting bodies 13–18 in the embodiments 2–7 as mentioned later.

Operation of the First Embodiment

In accordance with a radiant type thermometer of the first embodiment of the present invention, the supporting body 12 supports the protecting member 11 from the inner side of the probe 2. Due to this, force applied to the protecting member 11 from the outer side of the probe 2 when foreign matter attached to the protecting member 11 is dispersed by the supporting body 12. Therefore, the possibility of the protecting member 11 to be damaged can be decreased.

As described above, in accordance with the first embodiment of the present invention, the strength of the protecting member 11 can be increased. Therefore, the possibility of the occurrence of failures deriving from damage to the protecting member 11 can be decreased compared with the conventional radiant type thermometer. In addition, a user can execute the removal of foreign matter attached to the protecting member 11 (cleaning of the protecting member 11) with more ease than in the past.

Moreover, since the strength of the protecting member 11 increases, the thickness of the protecting member 11 can be less thick than the conventional radiant type thermometer. Therefore, the transmittance of infrared rays can be increased and, even if a certain amount of infrared rays are interrupted by the supporting body 12, the amount of infrared rays equal to or more than that in the conventional radiant type thermometer can reach the thermopile 6.

Furthermore, since the thickness of the protecting member 11 can be less, the manufacturing costs of the protecting member 11 can be decreased compared with those in the conventional radiant type thermometer, hence the manufacturing costs for a radiant type thermometer can be decreased.

Second embodiment

A radiant type thermometer in accordance with the second embodiment of the present invention will now be described. Since the second embodiment is the same as the first embodiment except the structure of a supporting body, only a supporting body is described and other structures are omitted from description.

Figure 3:
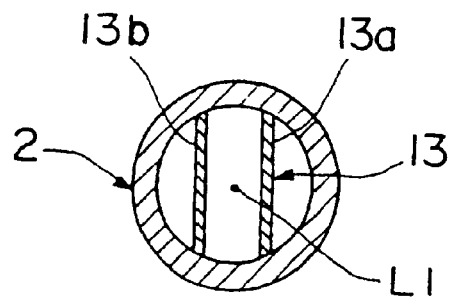
FIG. 3 is an explanatory view of the second embodiment.

FIG. 3 is an explanatory view of the second embodiment. The structural view of a supporting body 13 in the second embodiment that is equivalent to the X—X line cross sectional view shown in FIG. 2B is shown in FIG. 3. The supporting body 13 consists of two flat plate-like members 13a, 13b. Each flat plate-like member 13a, 13b is disposed in parallel with each other with an equal distance from the central axis L1 and each end face (side) in the direction perpendicular to the central axis L1 is fixed to the internal wall 2a of the probe 2 respectively.

In addition, an end face of each of the flat plate-like members 13a, 13b in the end side of the probe 2 supports the protecting member 11 with substantially entire end face touching the protecting member 11. The thickness of each of the flat plate-like members 13a, 13b is the same as that in the first embodiment. Both end faces of the flat plate-like members 13a, 13b in the direction of the central axis L1 are parallel to each other and perpendicular to the central axis L1.

As in the first embodiment, the strength of the protecting member 11 can be increased by the second embodiment and an effect substantially similar to that of the first embodiment can be attained. Moreover, the protecting member 11 is supported at more parts than in the first embodiment, the strength of the protecting member 11 can be increased compared with the first embodiment.

Third embodiment

A radiant type thermometer in accordance with the third embodiment of the present invention will now be described. Since the third embodiment is the same as the first embodiment except the structure of a supporting body, only a supporting body is described and other structures are omitted from description.

Figure 4:
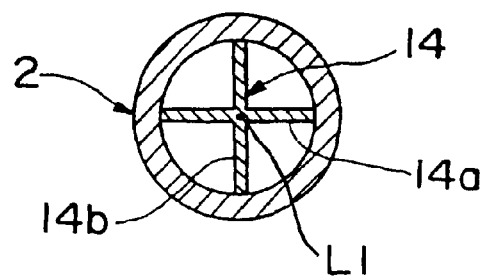
FIG. 4 is an explanatory view of the third embodiment.

FIG. 4 is an explanatory view of the third embodiment. The structural view of a supporting body 14 in the third embodiment that is equivalent to the X—X line cross sectional view shown in FIG. 2B is shown in FIG. 4. The supporting body 14 consists of two flat plate-like members 14a, 14b intersecting perpendicularly to each other along the central axis L1. An end face (side) of each of the flat plate-like member 14a, 14b in the direction perpendicular to the central axis L1 is fixed to the internal wall 2a of the probe 2 respectively.

In addition, an end face of each of the flat plate-like members 14a, 14b in the end side of the probe 2 supports the protecting member 11 with substantially the entire end face touching an end face in the inner side of the probe 2 of the protecting member 11. The thickness of each of the flat plate-like members 14a, 14b is the same as that in the first embodiment. Both end faces of the flat plate-like members 14a, 14b in the direction of the central axis L1 are parallel to each other and perpendicular to the central axis L1.

As in the first embodiment, the strength of the protecting member 11 can be increased by the third embodiment and an effect substantially similar to that of the first embodiment can be attained. Moreover, the protecting member 11 is supported at more parts than in the first embodiment, the strength of the protecting member 11 can be increased compared with the first embodiment.

As in the first embodiment, the strength of the protecting member 11 can be increased by the third embodiment and an effect substantially similar to that of the first embodiment can be attained. Moreover, the protecting member 11 is supported at more parts than in the first embodiment, the strength of the protecting member 11 can be increased compared with the first embodiment.

Fourth embodiment

A radiant type thermometer in accordance with the fourth embodiment of the present invention will now be described. Since the fourth embodiment is the same as the first embodiment except the structure of a supporting body, only a supporting body is described and other structures are omitted from description.

Figure 5:
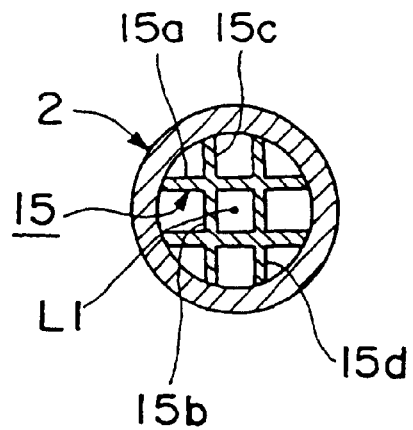
FIG. 5 is an explanatory view of the fourth embodiment.

FIG. 5 is an explanatory view of the fourth embodiment. The structural view of a supporting body 15 in the fourth embodiment that is equivalent to the X—X line cross sectional view shown in FIG. 2B is shown in FIG. 5. The supporting body 15 consists of flat plate-like members 15a, 15b disposed in parallel to each other with an equal distance to the central axis L1 and flat plate-like member 15c, 15d disposed in parallel to each other with an equal distance to the central axis L1. Each of the flat plate-like members 15a, 15b is perpendicular to each of the flat plate-like members 15c, 15d. With this structure, the shape of the end face of the supporting body 15 is formed in a parallel cross shape.

An end face (side) of each of the flat plate-like member 15a, 15b, 15c, 15d in the direction perpendicular to the central axis L1 is fixed to the internal wall 2a of the probe 2 respectively. In addition, an end face of each of the flat plate-like members 15a, 15b, 15c, 15d in the end side of the probe 2 supports the protecting member 11 with substantially the entire face touching an end face in the inner side of the probe 2 of the protecting member 11. The thickness of each of the flat plate-like members 15a, 15b, 15c, 15d is the same as that in the first embodiment. Both end faces of the flat plate-like members 15a, 15b, 15c, 15d in the direction of the central axis L1 are parallel to each other and perpendicular to the central axis L1.

As in the first embodiment, the strength of the protecting member 11 can be increased by the fourth embodiment and an effect substantially similar to that of the first embodiment can be attained. Moreover, the protecting member 11 is supported at more parts than in the first through third embodiments, the strength of the protecting member 11 can be increased compared with the first through third embodiments.

Fifth embodiment

A radiant type thermometer in accordance with the fifth embodiment of the present invention will now be described. Since the fifth embodiment is the same as the first embodiment except the structure of a supporting body, only a supporting body is described and other structures are omitted from description.

Figure 6:
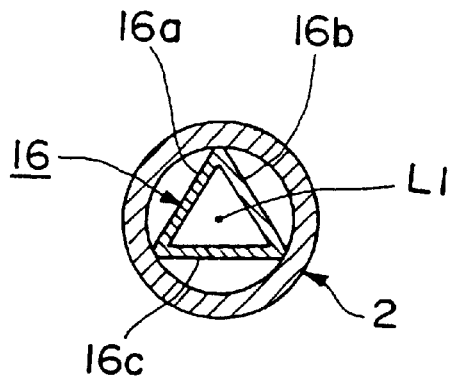
FIG. 6 is an explanatory view of the fifth embodiment.

FIG. 6 is an explanatory view of the fifth embodiment. The structural view of a supporting body 16 in the fifth embodiment that is equivalent to the X—X line cross sectional view shown in FIG. 2B is shown in FIG. 6. The supporting body 16 consists of flat plate-like members 16a, 16b, 16c disposed in parallel with the central axis L1 and with an equal distance to the central axis An end part of each of the flat plate-like members 16a, 16b, 16c in the direction perpendicular to the central axis L1 is fixed to the internal wall 2a of the probe 2 with the end parts connected to the end parts of the other two flat plate-like members. With this structure, an end face shape of the supporting body 16 is an equilateral triangle with connecting points of flat plate-like members as vertexes and the central axis L1 as a median point.

In addition, an end face of each of the flat plate-like members 16a, 16b, 16c in the end side of the probe 2 supports the protecting member 11 with substantially the entire end face touching an end face in the inner side of the probe 2 of the protecting member 11. The thickness of each of the flat plate-like members 16a, 16b, 16c is the same as that in the first embodiment. Both end faces of the flat plate-like members 16a, 16b, 16c in the direction of the central axis L1 are parallel to each other and perpendicular to the central axis L1.

As in the first embodiment, the strength of the protecting member 11 can be increased by the fifth embodiment and an effect substantially similar to that of the first embodiment can be attained.

Further, if an end part (a vertex of the triangle shape) of each of the flat plate-like member 16a, 16b, 16c in the direction perpendicular to the central axis L1 is fixed to the inner wall 2a of the probe 2, a triangle shape formed by the flat plate-like members 16a, 16b, 16c may take any shape, but preferably is formed such that an angle formed by the neighboring flat plate-like members is 30 degrees to 90 degrees.

In addition, the shape of an end face (cross section) in the direction perpendicular to the central axis of the supporting body is not limited to a triangle but may take the shape of a polygon (for example, a square to a dodecagon).

Sixth embodiment

A radiant type thermometer in accordance with the sixth embodiment of the present invention will now be described. Since the sixth embodiment is the same as the first embodiment except the structure of a supporting body, only a supporting body is described and other structures are omitted from description.

Figure 7:
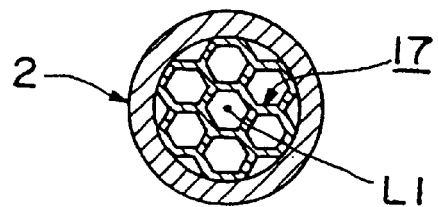
FIG. 7 is an explanatory view of the sixth embodiment.

FIG. 7 is an explanatory view of the sixth embodiment. The structural view of a supporting body 17 in the sixth embodiment that is equivalent to the X—X line cross sectional view shown in FIG. 2B is shown in FIG. 7. The supporting body 17 is composed of a honeycomb structure formed to surround one of six hexagonal tubes of the same size. The end face shape of the supporting body 17 is a hexagonal lattice. The thickness of a wall taking this honeycomb structure is preferably 0.2 mm to 0.3 mm.

The supporting body 17 is disposed coaxially with the central axis L1 (in parallel with the central axis L1) between the end part and the middle part 2b of the probe 2 and, one of its sides (end part in the direction perpendicular to the central axis L1) is fixed to the internal wall 2a of the probe 2.

An end face of the supporting body 17 in the end side of the probe 2 supports the protecting member 11 with substantially the entire end face touching the end face in the internal side of the probe 2 of the protecting member 11. In addition, both end faces of the supporting body 17 in the direction of the central axis L1 are parallel and perpendicular to the central axis L1.

As in the first embodiment, the strength of the protecting member 11 can be increased by the sixth embodiment and an effect substantially similar to that of the first embodiment can be attained.

Further, the shape of an end face of the supporting body 17 is composed in a hexagonal lattice shape but may be composed in the shape of other lattice shape (for example, a triangle lattice shape, a perpendicular lattice shape, an octagonal lattice shape and the like).

In addition, if an end face (cross section) in the direction perpendicular to the central axis L1 is composed in a lattice shape as in the supporting body 17, the thickness of each wall forming the lattice shape preferably is 0.2 mm to 0.3 mm.

Embodiment 7

A radiant type thermometer in accordance with the seventh embodiment of the present invention will now be described. Since the seventh embodiment is the same as the first embodiment except the structure of a supporting body, only a supporting body is described and other structures are omitted from description.

Figure 8:
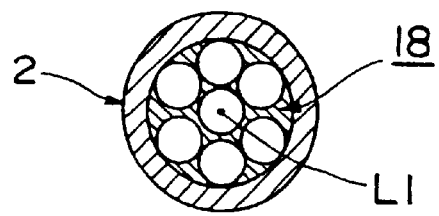
FIG. 8 is an explanatory view of the seventh embodiment.
Figure 9:
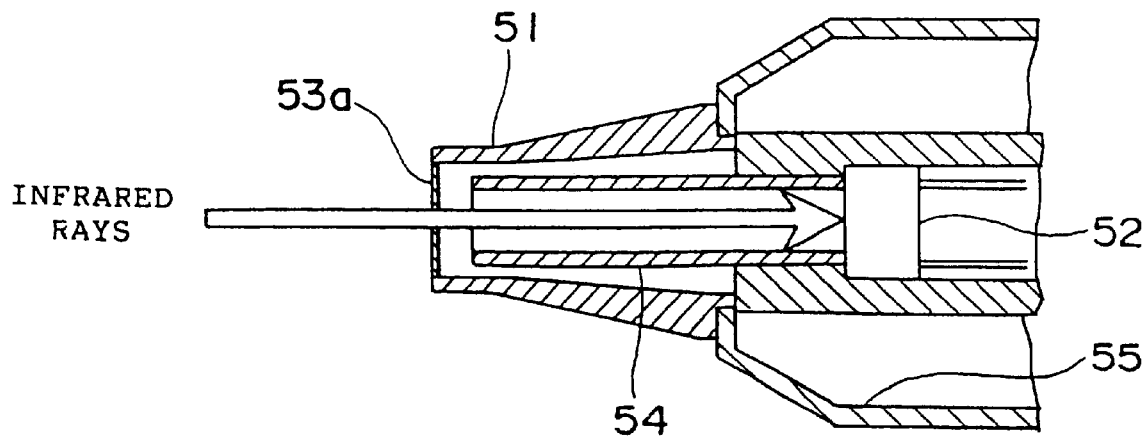
FIG. 9 illustrates a structure of a conventional radiant type thermometer.
Figure 10:
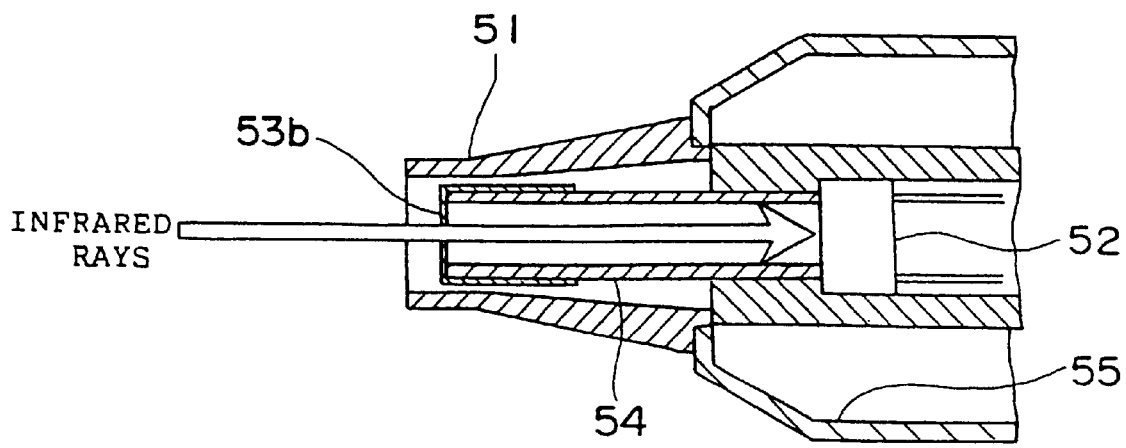
FIG. 10 illustrates a structure of a conventional radiant type thermometer.

FIG. 8 is an explanatory view of the seventh embodiment. The structural view of a supporting body 18 in the seventh embodiment that is equivalent to the X—X line cross sectional view shown in FIG. 2B is shown in FIG. 8. The supporting body 18 is formed in a cylindrical shape having an outer diameter that is substantially the same as the internal diameter of the probe 2 between the end part and the middle part 2b of the probe 2, and seven through holes are formed in its axial direction.

The internal face of each through hole is formed of a tubular face having the central axis. One of the through holes is formed coaxially with the central axis of the supporting body 18, other through holes are formed around the through hole with an equal distance from the central axis of the supporting body 18, and the central axes of these other through holes are parallel to the central axis of the supporting body 18.

The supporting body 18 is fixed to the internal wall 2a of the probe 2 with its circumferential surface touching the internal wall 2a, and the probe 2 and the supporting body 18 are coaxial. Therefore, the central axis of each through hole is disposed coaxially with or in parallel to the central axis L1. The end face of the supporting body 18 in the end side of the probe 2 supports the protecting member 11 with substantially all of the end face touching the end face of the protecting member 11 in the internal side of the probe 2. In addition, both the end faces of the supporting body 18 in the direction of the central axis L1 are parallel with each other and perpendicular to the central axis L1, respectively.

As in the first embodiment, the strength of the protecting member 11 can be increased by the seventh embodiment and an effect substantially similar to that of the first embodiment can be attained.

Further, the supporting body 18 having a plurality of through holes with circular faces is explained in the sixth embodiment, but the end face of the through hole may be formed in a polygon shape as far as the occupancy of the area of the supporting body to the area of the inside of the probe 2 in the direction perpendicular to the central axis L1 is set at more than 0% and 50% or less.

Example of Variation of Embodiments

In the above-mentioned first through seventh embodiments, the protecting member 11 is composed of a plate-like member (protecting plate) formed of silicon and germanium. Alternatively, the protecting member 11 may be composed of a film (protecting film) made from PE or PP and the protecting film is provided on the end part of the probe 2 in the direction perpendicular to the central axis L1 (for example, stretched or stuck) so that the end part of the probe 2 is blocked.

Even in this case, if the protecting film is made to be supported with the end faces of the above-mentioned supporting bodies 12 through 18 in the end side of the probe 2 touching the face of the protecting film in the internal side of the probe 2, an effect similar to that of the first through seventh embodiments can be attained.

In addition, each of the supporting bodies 12 through 18 may be arranged to always touch the protecting member 11 or may be arranged to support the protecting member 11 by touching the protecting member 11 when the protecting member 11 is pressed from outside and is deformed to some extent. That is, some aperture may be formed between the protecting member 11 in its ordinary state and the supporting bodies 12 through 18.

Further, although the examples in which each of the supporting bodies 12 through 18 and the protecting member 11 are composed separately are described in the first to seventh embodiments, each of the supporting bodies 12 through 18 and the protecting member 11 may be integrally molded using synthetic resin such as PE and PP. In this case, the boundary between the protecting member 11 and each of the supporting bodies 12 through 18 needs not to be clear.

Moreover, although the examples in which each of the supporting bodies 12 through 18 and the probe 2 are formed separately and each of the supporting bodies 12 through 18 is fixed to the internal wall 2a of the probe 2 are described in the first through seventh embodiments, the probe 2 and each of the supporting bodies 12 through 18 may be integrally formed using synthetic resin such as PE and PP. In this case, the boundary between the internal wall 2a of the probe 2 and each of the supporting bodies 12 through 18 needs not to be clear.

Furthermore, the probe 2, the protecting member 11 and each of the supporting bodies 12 through 18 may be integrally formed using synthetic resin such as PE and PP. In this case, each boundary between the probe 2, the protecting member 11 and each of the supporting bodies 12 through 18 needs not to be clear.

Therefore, if the protecting member 11 and each of the supporting bodies 12 through 18 or the probe 2 are integrally formed, the material shall be basically the same as that of the protecting member 11. With such an integral formation, manufacturing processes of a radiant type thermometer can be reduced and the efficiency of manufacturing can be improved.

The strength of a protecting member such as a protecting plate and a protecting film can be improved with a radiant type thermometer in accordance with the present invention.

What is claimed is:

1. A radiant type thermometer for measuring the temperature of a subject based on infrared rays emitted from the subject comprising:

a main body;

a tubular probe fixed to said main body with its end extruding from said main body and its inside forming a path of infrared rays from the subject to the inside of said main body;

a protecting member for blocking an opening in the end side of said probe and transmitting infrared rays; and a supporting body positioned in a path of said infrared rays for supporting said protecting member by touching said protecting member, disposed in parallel with the central axis of said probe in the path inside said probe, with its end part disposed in the direction perpendicular to said central axis being fixed to the internal wall of said probe.

2. A radiant type thermometer according to claim 1 wherein said supporting body is composed of a plate-like member.

3. A radiant type thermometer according to claim 1 wherein said supporting body is composed of a plurality of plate-like members disposed in parallel with each other.

4. A radiant type thermometer according to claim 1 wherein said supporting body is composed of two plate-like members perpendicular with each other.

5. A radiant type thermometer according to claim 1 wherein said supporting body is composed of a plurality of plate-like members crossing with each other.

6. A radiant type thermometer according to claim 1 wherein said supporting body is composed of a plurality of plate-like members that are disposed so that an end face viewed from the direction of the central axis of said probe forms a polygon.

7. A radiant type thermometer according to any one of claims 2 through 6 wherein the thickness of said plate-like member is an integer times of the wavelength of infrared rays passing through said protecting member.

8. A radiant type thermometer according to any one of claims 2 through 6 wherein the thickness of said plate-like member is 0.01 mm to 0.5 mm.

9. A radiant type thermometer according to claim 1 wherein an end face of said supporting body in the direction of the central axis of said probe is composed in a lattice shape.

10. A radiant type thermometer for measuring the temperature of a subject based on infrared rays emitted from the subject comprising:

a main body;

a tubular probe fixed with respect to said main body with its end extruding from said main body and its inside forming a path of infrared rays from the subject to the inside of said main body;

a protecting member for blocking the end part of said probe and transmitting infrared rays; and a supporting body for supporting said protecting member by touching said protecting member, disposed coaxially with the central axis of said probe inside said probe, with its circumferential surface being fixed to the internal wall of said probe and a plurality of through holes having axes parallel with the central axis of said probe being formed therein.

11. A radiant type thermometer according to claim 1 or 10 wherein, when said probe and said supporting body are cut in direction perpendicular to the central axis of said probe, a ratio of an occupancy of an area of said supporting body to the area inside said probe at a cut face is more than 0% and less than or equal to 50%.

12. A radiant type thermometer according to claim 1 or 10 wherein said supporting body is integrally molded with said protecting member.

13. A radiant type thermometer according to one of claims 1, 10 and 11 wherein said supporting body is integrally formed with and probe.

* * * * *